April 3, 1962 R. P. MAILLIARD 3,027,959
MOBILE LOAD CARRYING APPARATUS
Filed Feb. 6, 1959 4 Sheets-Sheet 1
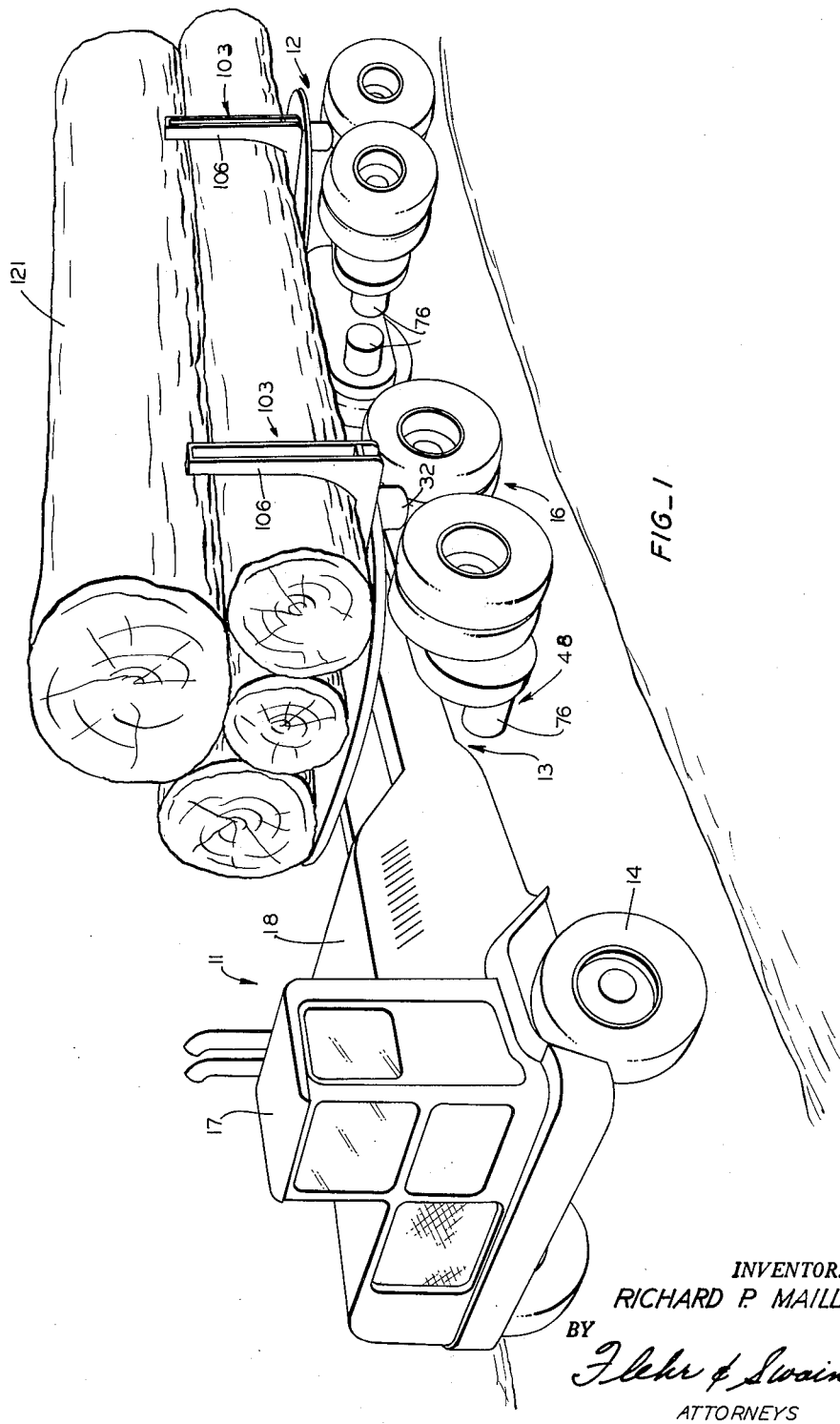
FIG_1
INVENTOR.
RICHARD P. MAILLIARD
BY
*Flehr & Swain*
ATTORNEYS

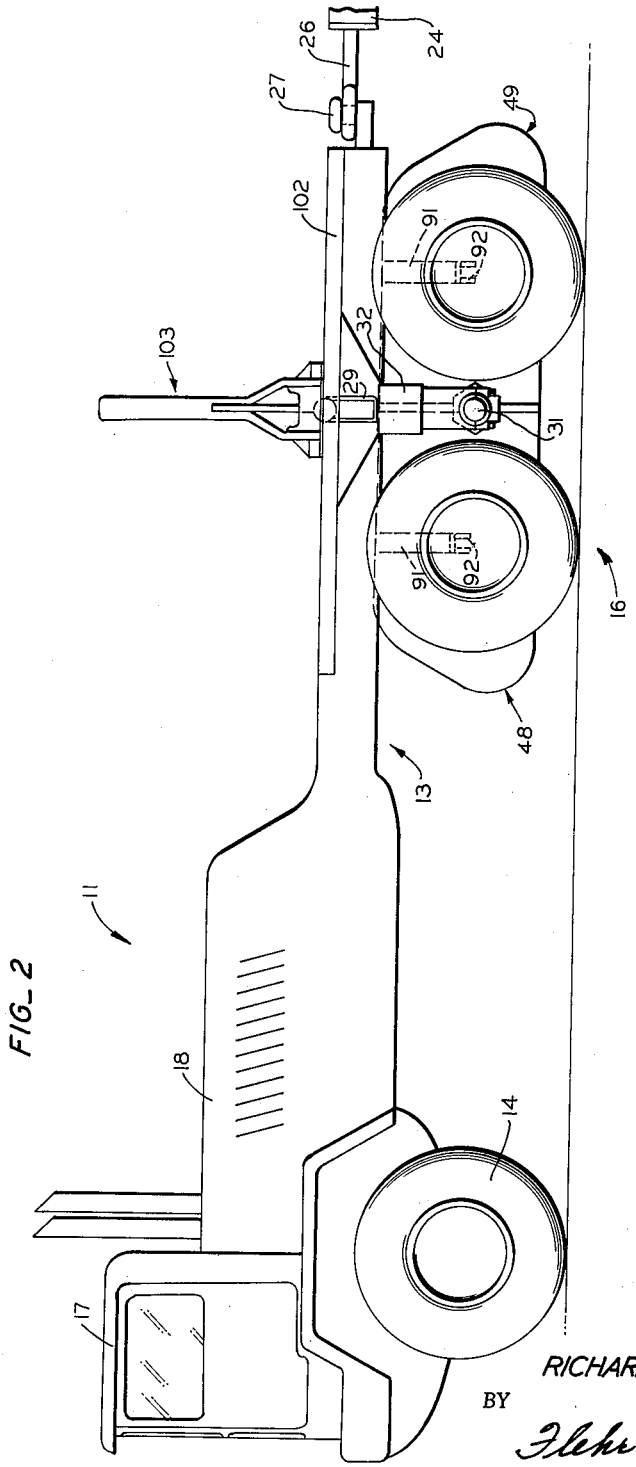

April 3, 1962 R. P. MAILLIARD 3,027,959
MOBILE LOAD CARRYING APPARATUS
Filed Feb. 6, 1959 4 Sheets-Sheet 3
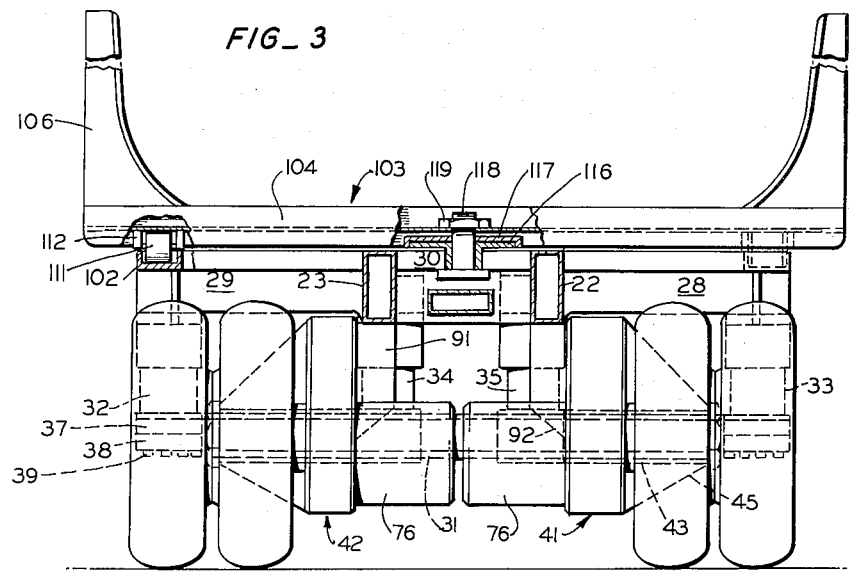
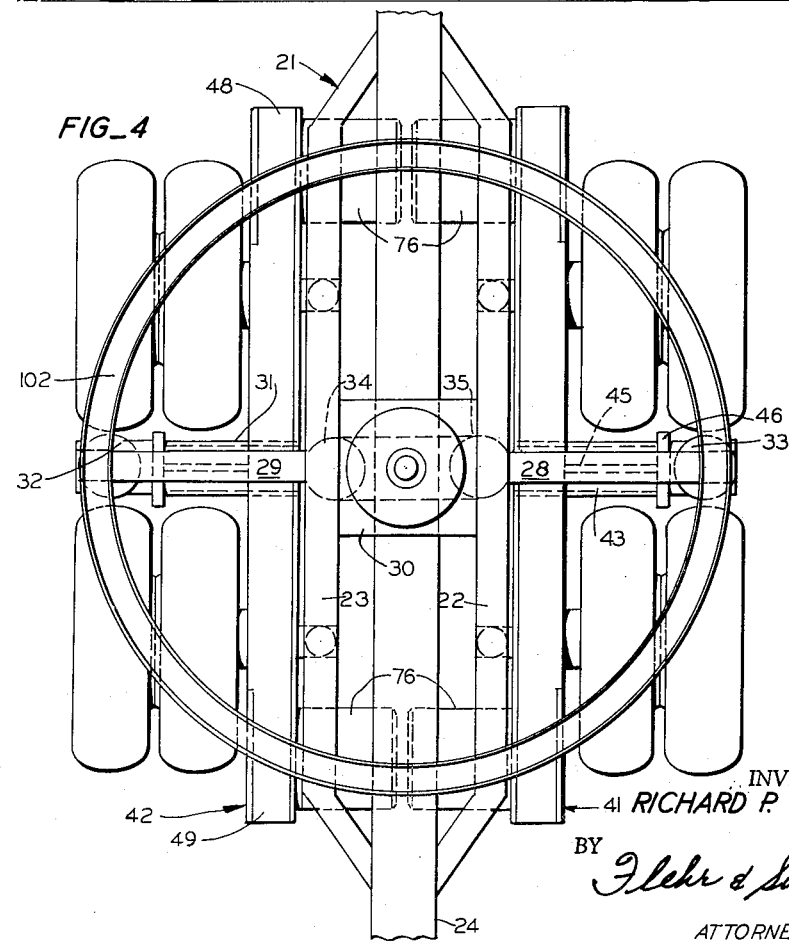
INVENTOR.
RICHARD P. MAILLIARD
BY
Flehr & Swain
ATTORNEYS April 3, 1962  R. P. MAILLIARD  3,027,959
MOBILE LOAD CARRYING APPARATUS
Filed Feb. 6, 1959  4 Sheets-Sheet 4
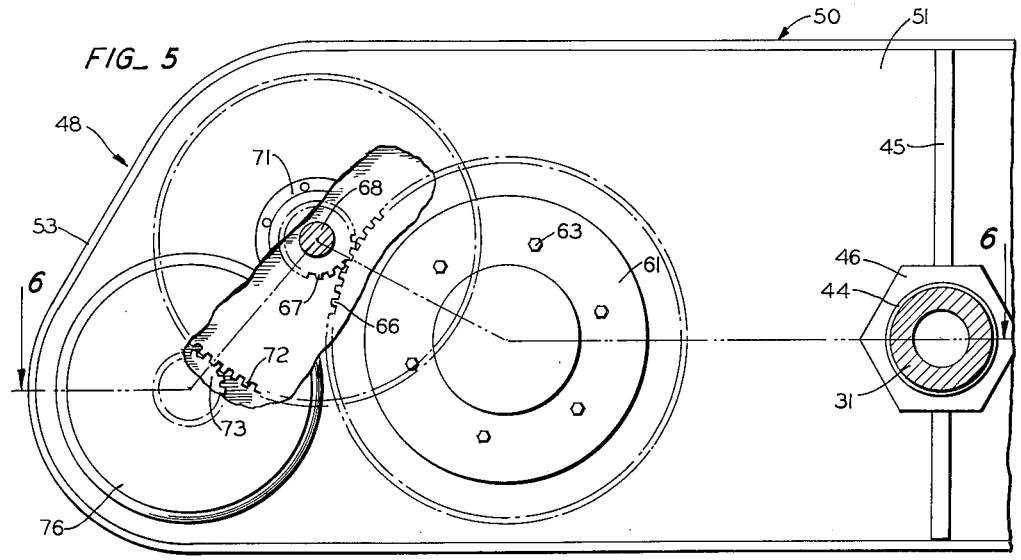
FIG_ 5
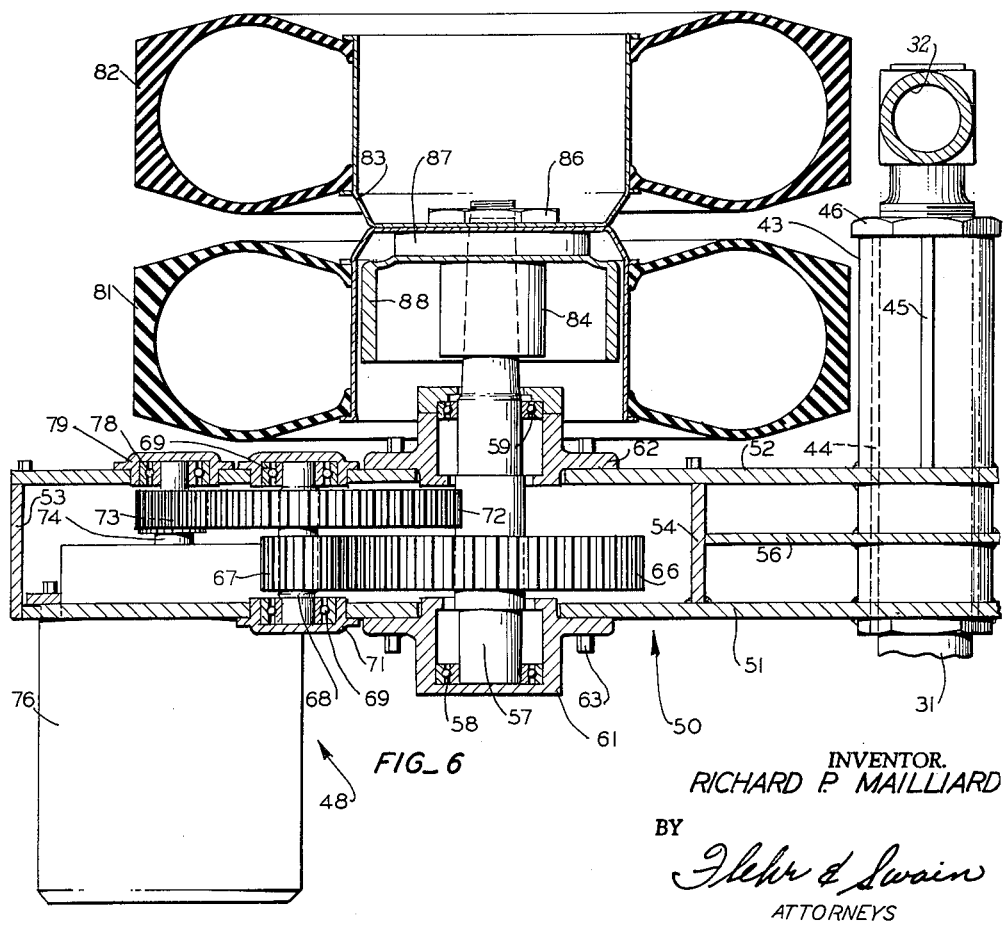
FIG_ 6
INVENTOR.
RICHARD P. MAILLIARD
BY
ATTORNEYS United States Patent Office 3,027,959
Patented Apr. 3, 1962

3,027,959
MOBILE LOAD CARRYING APPARATUS
Richard P. Mailliard, Azalea Park Road, Arcata, Calif.
Filed Feb. 6, 1959, Ser. No. 791,737
5 Claims. (Cl. 180—22)

This invention relates to a mobile load carrying apparatus and more particularly to such a mobile load carrying apparatus suitable for highway and off highway use.

In certain industries, it is desirable to transport large heavy loads over off highway terrain. For example, in the logging industry, it is often desirable to transport logs from the locations where they are cut in the woods to the saw mill or other desired locations over very rough or mountainous terrain. Heretofore, it has been difficult to apply sufficient horsepower to the driving wheels of the load carrying apparatus to move such heavy loads over steep grades and still maintain moderate speeds. This is primarily due to the difficulty in mechanically transmitting power from the power unit to the driving wheels of the vehicle. Drive transmissions, drive lines, universals, rear ends and the like become inordinately large and expensive when the power required for such drives must be transmitted. In addition, in the logging industry, it has been difficult to provide sufficient support for the rotatable bunks to prevent undue strain and wear and tear on the load carrying bunks and the vehicle itself. There is, therefore, a great need for a mobile load carrying apparatus which can be utilized for carrying heavy loads on and off the highway and more particularly, which can be used for carrying logs over very rough terrain.

In general, it is an object of the present invention to provide a mobile load carrying apparatus which is suitable for carrying heavy loads on and off the highway over rough terrain.

Another object of the invention is to provide a mobile load carrying apparatus of the above character which can negotiate steep grades while loaded at moderate speeds.

Another object of the invention is to provide a mobile load carrying apparatus of the above character in which greatly increased horsepower can be applied to the driving wheels of the vehicle.

Another object of the invention is to provide a load carrying apparatus of the above character in which the conventional drive transmission, drive line, universals, rear ends and springs are eliminated.

Another object of the invention is to provide a mobile load carrying apparatus of the above character in which electric drive means mounted on the walking beam of the vehicle is utilized for driving the driving wheels.

Another object of the invention is to provide a load carrying apparatus of the above character which includes a trailer and in which the trailer is substantially identical to the rear end of the truck or tractor.

Another object of the invention is to provide a load carrying apparatus of the above character in which the electric drive is placed in close proximity to the driving wheels to place greater weight on the driving wheels to thereby provide greater traction for the driving wheels.

Another object of the invention is to provide a mobile load carrying apparatus of the above character in which the frame is supported by air cylinders.

Another object of the invention is to provide a load carrying apparatus of the above character in which the rotatable bunks are supported on their outboard ends in all positions of the bunk.

Another object of the invention is to provide a load carrying apparatus of the above character in which shock absorber means is mounted between the frame of the vehicle and the walking beams.

Additional object and features of the invention will appear from the following description in which the preferred embodiment has been set forth in detail in conjunction with the following drawings.

Referring to the drawings:

FIGURE 1 is a perspective view of a mobile load carrying apparatus incorporating the present invention.

FIGURE 2 is a side elevational view of a portion of a load carrying apparatus shown in FIGURE 1.

FIGURE 3 is a rear elevational view of the trailer shown in FIGURE 1 with certain parts broken away.

FIGURE 4 is a plan view of the trailer shown in FIGURE 3.

FIGURE 5 is an enlarged detail view of one of the gear units mounted on the walking beam with certain parts broken away.

FIGURE 6 is a cross-sectional view taken along the line 6—6 of FIGURE 5.

In general, the mobile load carrying apparatus incorporating the present invention consists of a frame which is provided with ground engaging wheels. The ground engaging wheels are carried by a trunnion member. A walking beam is pivotally mounted on the trunnion member and the drive means for the wheels is mounted on the walking beam. A rotatable bunk is mounted on the frame and means is provided engaging the outboard ends of the bunk to support the outboard ends of the bunk from the trunnion member. The frame itself is supported by air suspension means carried by the trunnion member.

The mobile load carrying apparatus shown in FIGURES 1 and 2 of the drawings consists of a truck tractor 11 and a trailer 12 which is drawn by the truck tractor. The tractor 11 is comprised of a frame 13 which carries front ground engaging wheels 14 and rear ground engaging wheel assemblies 16. The front wheels 14 are mounted in any suitable manner such as by a front axle of the oscillating type well known to those skilled in the art to reduce twisting and fatigue of the frame 13. The rear wheel assemblies 16 are mounted and driven in a particular manner as hereinafter described more in detail in conjunction with the description of the trailer 12. A cab 17 is mounted on the frame 13 over the front wheels. An enclosure or housing 18 is mounted behind the cab 17 and encloses the motive power for the load carrying apparatus. The motive power is in the form of one or more engine-generator sets of a suitable type such as the Cummins Turbo VT 12 with 600 horsepower diesel engine and a D.-C. generator with controls. Such apparatus is of a type well known to those skilled in the art and hence will not be described in detail.

The construction of the rear end of the truck tractor 11 is substantially identical to that of the trailer 12 which is shown in FIGURES 4, 5, and 6.

The trailer 12 is comprised of a frame 21 which includes a pair of longitudinal frame members 22 and 23 that are inclined inwardly at the forward and rear ends and secured to a reach 24 which extends parallel to the frame members 22 and 23. Suitable means is provided to make possible attachment of the trailer 12 to the truck trailer 11 and as shown can consist of a hitch 26 connected to the reach 24 and adapted to be secured to the frame 13 of the truck 11 by a pin 27. The frame 21 also includes a pair of horizontal frame members 28 and 29 which extend outwardly from the frame members 22 and 23 and a substantially square horizontal frame member 30 fixed between members 22 and 23. The frame members 22 and 23 and 28 and 29 can be of a suitable type such as the box channel members shown in the drawing.

The frame 21 is supported in a suitable manner upon a trunnion member 31 in suitable form such as the tube shown. For example, the frame 21 can be supported by four air cylinders 32, 33, 34 and 35 which have their upper ends connected to the frame 21 and their lower ends connected to the trunnion tube 31. As will be noted, the air cylinders 32 and 33 are mounted on the outer ends of the trunnion tube 31 and therefore can be termed the outboard air cylinders whereas the air cylinders 34 and 35 are mounted on the trunnion tube between the cylinders 32 and 33 and therefore can be termed the inboard air cylinders. The outboard air cylinders 32 and 33 have their upper ends secured to the frame members 28 and 29 whereas the inboard air cylinders 33 and 34 have their upper ends secured to the frame member 22 and 23. The bottom end of each of the air cylinders is provided with a cup 37 and a cap 38 which are secured to the trunnion tube by suitable means such as bolts 39.

A pair of walking beams 41 and 42 are rotatably mounted on the trunnion tube 31. Each of the walking beams is provided with a journal box 43 which includes a bearing 44 of a suitable material such as bronze that engages the trunnion tube 31. The journal box is provided with a vertical reinforcing web 45. Each of the walking beams is held in place by suitable means such as the castellated nut 46 threaded on the trunnion tube.

Drive means is mounted on each of the walking beams and consists of front and rear drive units 48 and 49. Each of the units includes a gear housing 50 which has its side walls formed by steel plates 51 and 52, and end walls formed by steel plates 53 and 54 to provide a totally enclosed oil tight gear housing. Reinforcing webbing 56 is provided to firmly secure the gear housing to the journal box 43.

A stub shaft 57 is rotatably mounted in each of the gear housings by bearings 58 and 59 which are carried by bearing housings 61 and 62 removably secured to the gearing housings by suitable means such as bolts 63. A large gear 66 is mounted on the stub axle 57 within the gearing housing and is driven by a pinion 67 mounted on a shaft 68. The shaft 68 is rotatably mounted within the gear housing by suitable means such as the bearings 69 carried by caps 71 mounted in the side walls of the gear housing.

A gear 72 is also fixed to the shaft 68 and is driven by a pinion 73. The pinion 73 is mounted on the output shaft 74 of a motor 76 which is secured to the side wall 51 of the gearing housing. If desired, the outboard end of the output shaft 74 may be provided with a support consisting of a bearing 78 carried by a cap 79 mounted in the side walls of the gearing housing as shown in the drawing.

The motor 76 can be of any desired size and type, for example, in one embodiment it was found desirable to use D.-C. motors with a 150 horsepower rating.

A pair of tires 81 and 82 are mounted on the stub axle 57 in a manner which is substantially conventional as shown. The tires 81 and 82 are mounted on a dual wheel 83 which is fixed to a hub 84 mounted on the axle 57 by a castellated nut 86 threadedly engaging the axle and urging the hub of the wheel into engagement with a flange 87 provided on the hub 84. A brake drum 88 is mounted on the hub 84 and is adapted to be engaged by brake shoes (not shown).

Each of the walking beams is provided with a pair of shock absorbers 91 spaced at equal distances from the journal box 43 and supported on the gear housings 50 by brackets 92 affixed to the gear housings. The upper ends of the shock absorbers engage and are secured to the frame members 22 and 23 as shown in the drawing.

A bunk assembly is mounted on the frame 21 and consists of a turntable-like track 102 which is mounted upon the frame members 22 and 23 and the frame members 28 and 29. The track can be formed of any suitable material such as of the U-shaped fabricated channels shown in the drawings. The track 102 is substantially circular and is centrally disposed over the trunnion tube 31. A bunk or bolster 103 is pivotally mounted on the frame member 30 which is mounted between the frame members 22 and 23 as hereinbefore described. The bolster or the bunk 103 consists of a transverse member 104 formed of a suitable material such as of the H-beam shown. Bunk stakes 106 are pivotally mounted on the ends of the transverse member 104 and normally extend in a vertical direction. The bunk stakes 106 are of the type well known to those skilled in the art and hence will not be described in detail.

Means is provided on the outer ends of the bunk that engages the track 102 and consists of rollers 111 which are rotatably carried by brackets 112 fixed to the transverse member 104 as shown. The rollers are adapted to rotate about a horizontal axis and are adapted to ride in the track 102.

The bunk 103 is rotatably mounted in a suitable manner by a cup and saucer arrangement consisting of an integral T-shaped saucer and bushing 116 which is mounted on the frame member 30 and is formed of a suitable material such as bronze. A cup 117 of suitable material such as steel overlies the saucer 116 and is adapted to rotate thereon. A bunk center pin 118 and a castellated nut 119 threaded thereon extends through the cup and saucer 117 and 116 and firmly secures the bunk 103 to the framework 21.

As hereinbefore explained, the trailer which has just been described is substantially identical to the rear portion of the truck trailer 11 and for that reason, it will not be described in detail. Substantially all of its parts are identical to those of the trailer and they have been numbered accordingly.

Operation of the invention may now be briefly described as follows:

Let it be assumed that the mobile load carrying apparatus is being utilized for hauling logs as shown in FIGURE 1 of the drawing. As shown, the trailer is connected to the truck tractor and the logs 121 are loaded on the bunks of the truck and the trailer. The bunks, in addition to being supported by the conventional cup and saucer arrangement, also have their outer ends supported by the track structure 102 which is engaged by the rollers 111 carried by the bunk. The rollers in the track are so disposed that the outer ends of the bunk are supported in all positions of the bunk. Therefore, when the mobile load carrying vehicle is negotiating a sharp turn, the outer ends of the bunks will be supported.

By providing support for the outer ends of the bunk, additional stability is given to the load carrying vehicle, particularly in the case when heavy loads are being carried. Moreover, in addition to providing additional stability, the support for the outer ends of the bunks helps to prevent the vehicle from tipping over and reduces the wear and tear on the cup and saucer arrangement and on the vehicle.

The load carrying apparatus is propelled by electric drive means consisting of the drive unit for each pair of drive wheels. The drive units are controlled from the cab 17 and are supplied with energy from the motor generator sets within the enclosure 18. The drive units for each of the dual wheels includes a motor 76 and the associated gearing which is mounted on the walking beam of the vehicle. By mounting the motor on the walking beam so that it extends inwardly from the walking beam, a motor of any desired size can be utilized. For example, if necessary motors up to 750 to 1,000 horsepower can be mounted on the walking beam without encountering insurmountable space problems. By also mounting the speed reduction gearing within the walking beam, it is possible to transmit the desired amount of power without encountering space problems. As shown in FIGURE 4 there is additional space available if increased horsepower is needed for the driving wheels.

The use of separate electric drives for each of the dual wheels makes it possible to apply any amount of power to each of the dual wheels to provide the desired drive by the vehicle. The amount of power applied to each of the dual wheels can be regulated in accordance with the traction encountered by the dual wheel. Since the drive including the drive motor and the associated gearing is mounted in close proximity to the wheel, the weight of the drive unit greatly increases the traction of the wheel.

The use of an electric drive is particularly advantageous in that it permits power to be applied to the wheels of the trailer 12 which is not possible or feasible with the conventional truck and trailer arrangement in which the truck is driven by conventional mechanical means. The drive motors 76 can be used as brakes to supplement the conventional brakes when going down steep grades.

The use of electric drive also has other well-known advantages such as easy, smooth starting and stopping which is not possible with conventional mechanical drives. This eliminates wear and tear on the load carrying apparatus.

The walking beam is constructed so that it is oil tight and so that the gearing in the walking beam runs in a bath of oil. Shock absorbers are mounted on the walking beams to eliminate shock. The frame is mounted on the trunnion member by the four air cylinders which absorb loading shocks and road shocks. In addition to supporting the frame in the conventional manner, two of the air cylinders are utilized for supporting the outboard ends of the frame upon the trunnion tube to stabilize the frame and the bunk to prevent rocking and twisting of the frame as the vehicle moves over rough terrain.

It has been found that with such a vehicle, it is possible to travel over highway and off highway surfaces without difficulty. The separate electric drive for each of the dual wheels makes it possible to apply large amounts of horsepower to each of the wheels so that heavy loads can be transported over very steep grades at moderate speeds.

It is apparent from the foregoing that I have provided a new and improved mobile load carrying apparatus which is particularly adapted for carrying heavy loads on highway and off highway terrain without difficulty. The load carrying bunks have their outboard ends supported to stabilize the vehicle as it moves over rough terrain to prevent susbtantial bending, twisting and rocking of the frame and bunk. In particular, the outer ends of the bunk are supported in all positions of rotation of the bunk.

I claim:
1. In a mobile load carrying apparatus, a frame, a trunnion extending transversely of the frame, means for supporting the frame on the trunnion, a pair of walking beams pivotally mounted on said trunnion and disposed on opposite sides of said frame, at least one ground engaging wheel carried by each end of the walking beam, said ground engaging wheels being disposed on opposite sides of said trunnion, motive means mounted on each end of the walking beam, speed reducing gearing mounted within the walking beam and connecting the motive means to the associated ground engaging wheels, and a source of power and control means for independently controlling the respective motive means from the source of power.

2. A mobile load carrying apparatus as in claim 1 wherein each motive means mounted on the walking beam is mounted so it faces inwardly from the walking beam.

3. A mobile load carrying apparatus as in claim 1 wherein each of said motive means is an electric motor.

4. A mobile load carrying apparatus as in claim 1 together with shock absorber means mounted between the walking beams and the frame.

5. A mobile load carrying apparatus as in claim 1 wherein said means for supporting the frame on the trunnion consists of a plurality of fluid cylinders disposed longitudinally of the trunnion, two of the fluid cylinders being mounted on the ends of the trunnion and serving to support the transverse extremities of the frame.

References Cited in the file of this patent

UNITED STATES PATENTS

| | | |
|---|---|---|
| 1,149,153 | Schleicher | Aug. 3, 1915 |
| 1,287,468 | Shadbolt | Dec. 10, 1918 |
| 1,574,468 | Clement | Feb. 23, 1926 |
| 1,692,891 | Fageol | Nov. 27, 1928 |
| 1,728,889 | Kemble | Sept. 17, 1929 |
| 1,887,042 | Rogers | Nov. 8, 1932 |
| 2,150,576 | Bell | Mar. 14, 1939 |
| 2,237,575 | Quartullo | Apr. 8, 1941 |
| 2,280,741 | Bolster et al. | Apr. 21, 1942 |
| 2,360,619 | Peterman | Oct. 17, 1944 |
| 2,520,776 | Page | Aug. 29, 1950 |
| 2,590,388 | Dornath | Mar. 25, 1952 |
| 2,663,569 | Gouirand | Dec. 22, 1953 |
| 2,689,136 | Hendrickson | Sept. 14, 1954 |
| 2,729,298 | LeTourneau | Jan. 3, 1956 |